(No Model.) 4 Sheets—Sheet 1.

J. FEHRER.
CORN PLANTER.

No. 384,834. Patented June 19, 1888.

Witnesses:
Inventor:
Joseph Fehrer (No Model.) 4 Sheets—Sheet 3.

J. FEHRER.
CORN PLANTER.

No. 384,834. Patented June 19, 1888.

Witnesses:
D. C. Winebrener
Abram S. Bohn

Inventor:
Joseph Fehrer (No Model.) 4 Sheets—Sheet 4.
J. FEHRER.
CORN PLANTER.
No. 384,834. Patented June 19, 1888.
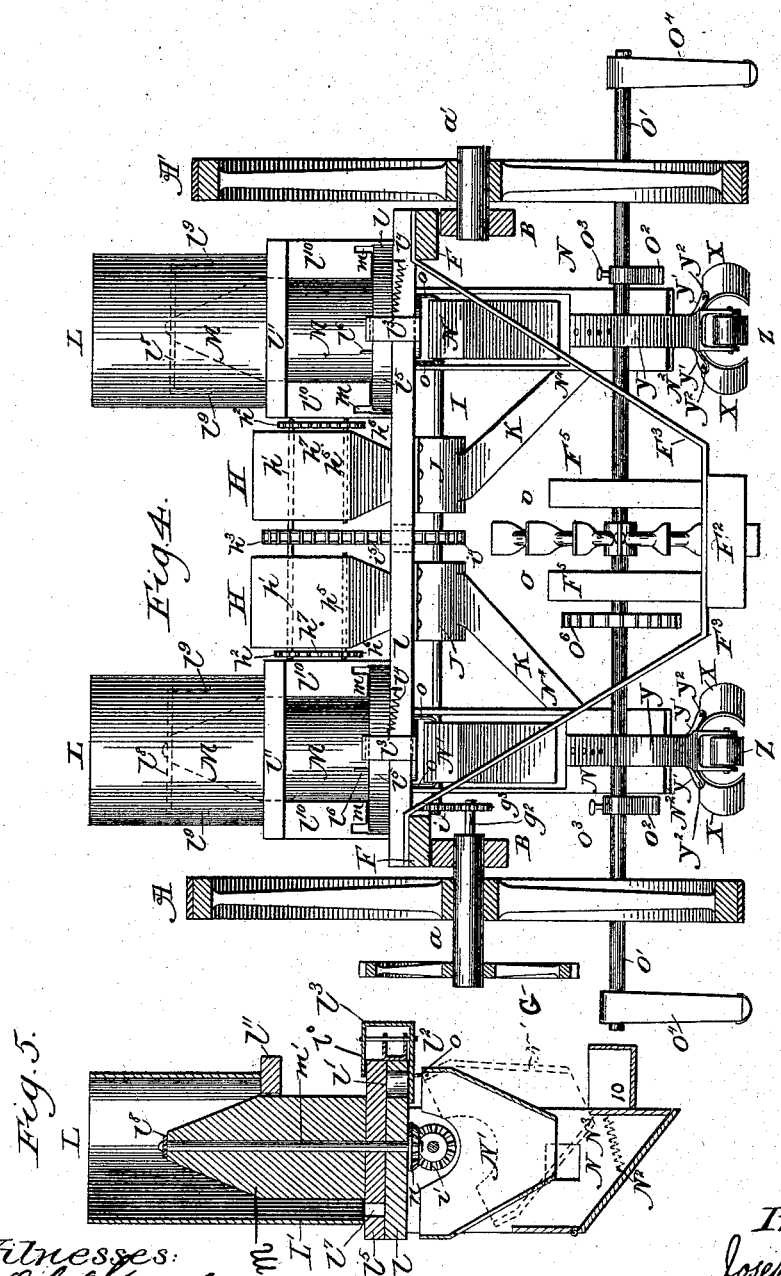
Witnesses:
D. C. Wineken
Abram S. Bohn
Inventor.
Joseph Fehrer
J. E. Duff
Atty.

UNITED STATES PATENT OFFICE.

JOSEPH FEHRER, OF FREDERICK, MARYLAND, ASSIGNOR OF ONE-HALF TO ABRAHAM S. BOHN, OF SAME PLACE.

CORN-PLANTER.

SPECIFICATION forming part of Letters Patent No. 384,834, dated June 19, 1888.

Application filed December 23, 1886. Serial No. 222,414. (No model.)

*To all whom it may concern:*

Be it known that I, JOSEPH FEHRER, a citizen of the United States, residing at Frederick, in the State of Maryland, have invented a new and useful Improved Corn-Planter, of which the following is a specification.

My invention relates to an improvement in seed-planters.

The object of my invention is to provide a corn-planter in which the seed distributing and dropping mechanism is carried by a movable frame hinged upon the main supporting-frame, whereby the said distributing and dropping mechanism can be thrown in and out of gear with its driving-power by raising or lowering the movable frame through the medium of a rock-shaft and operating-lever.

A further object is to provide a seed-distributing mechanism provided with a rotary grain-counting plate, whereby the number of seed to be dropped in each hill can be regulated.

A further object is to provide fertilizer boxes and distributing mechanism operated simultaneously with the seed-distributing mechanism, whereby the fertilizer and seed will be dropped together.

A further object is to provide a ground-wheel for operating the dropping-valves of seed and fertilizer dropping tubes, whereby the seed is dropped in hills at a regular and equal distance apart and each hill may be located by revolving markers, also operated by said ground-wheel.

A further object is to provide changeable markers which can be thrown in and out of engagement with the ground to mark the rows and serve as a guide for the driving-wheels.

A further object is to provide suitable scrapers or levelers, furrow-openers, and furrow-coverers of improved construction.

A further object is to provide gearing and mechanism for connecting and operating the entire machine; and a further object is to provide a corn-planter for general use with all classes of farmers and which shall do its work with greater rapidity and accuracy, and at the same time be more efficient and sure in its operation than the corn-planters heretofore in use.

My invention consists in certain novel features of construction and combinations of parts, more fully described hereinafter, and pointed out in the claims.

Figure 1:
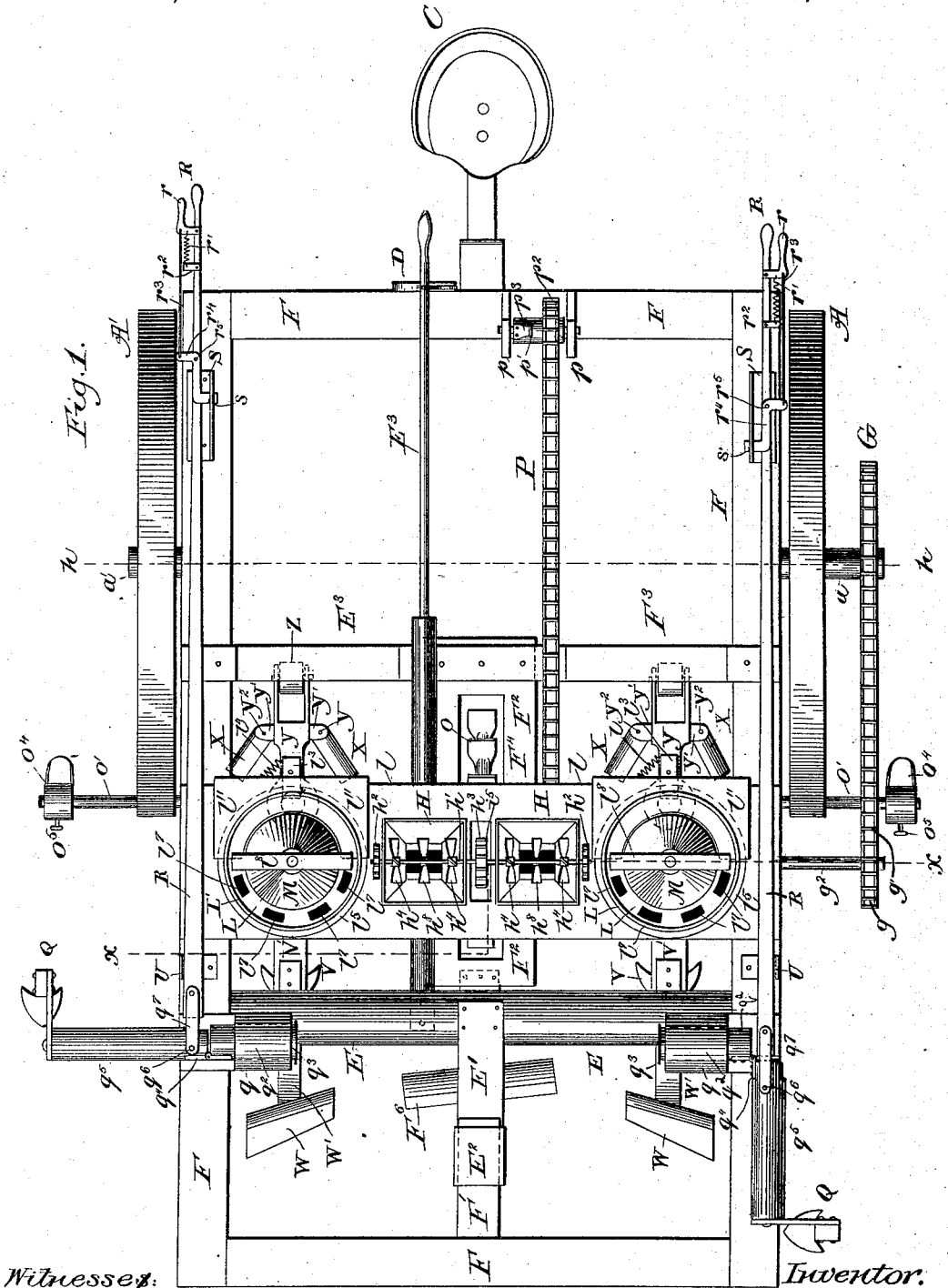
Figure 2:
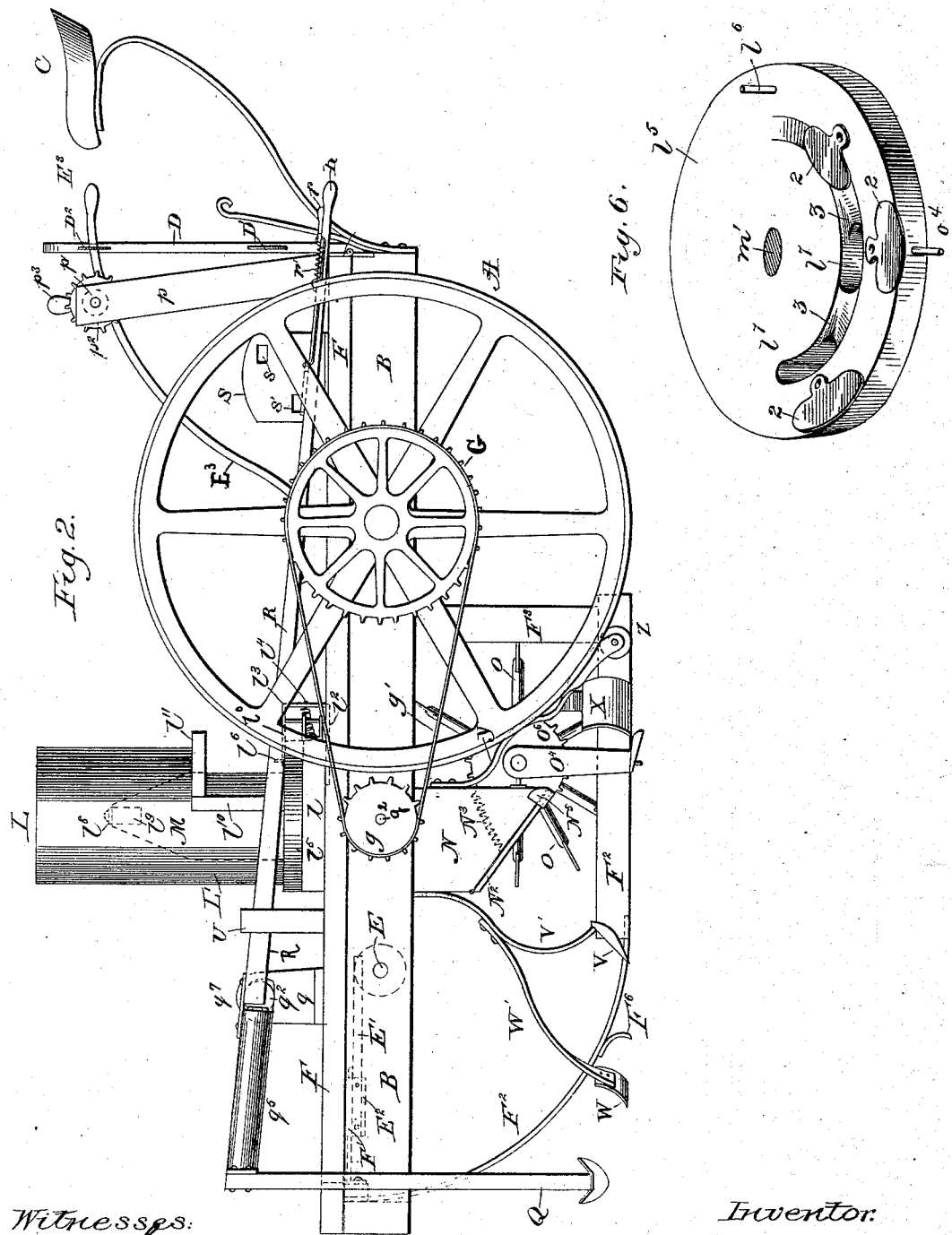
Figure 3:
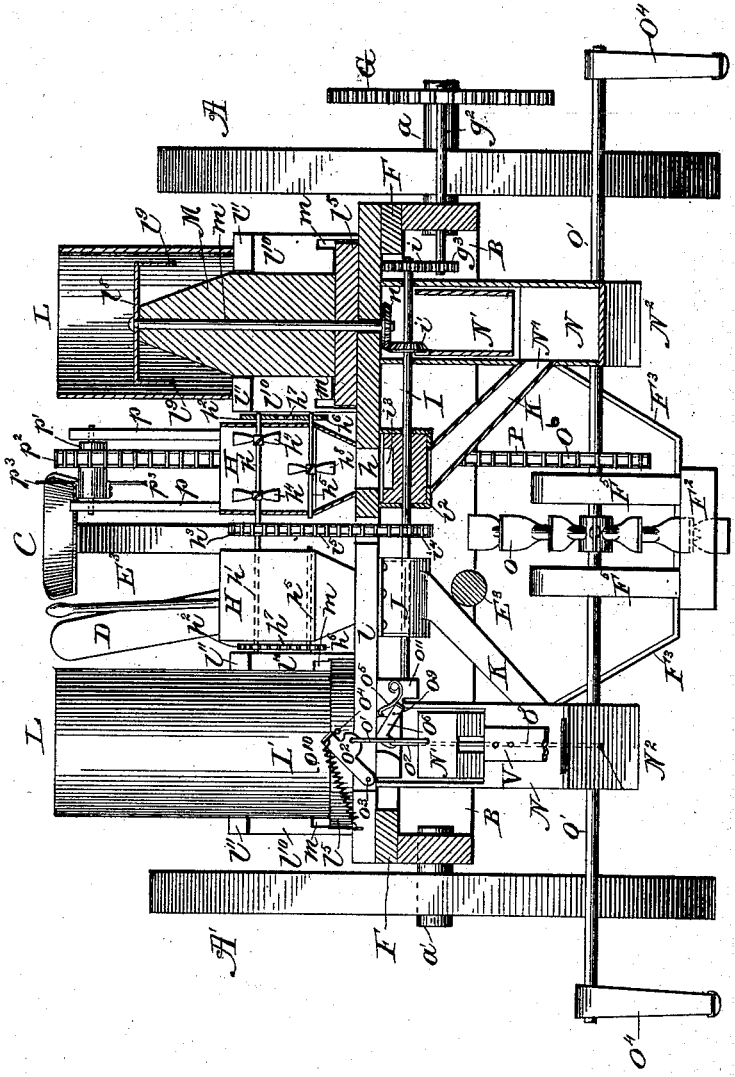

In the accompanying drawings, Figure 1 is a top plan view of my complete device. Fig. 2 is a side elevation of the same. Fig. 3 is a section on line $x\ x$ in Fig. 1. Fig. 4 is a section on the line $h\ h$, Fig. 1. Fig. 5 is a longitudinal section of one of the seed counting and distributing mechanisms, and Fig. 6 a detail view of rotary seed-plate.

In the drawings, the reference-letter B represents the main frame of my machine, which is carried by the main driving-wheels A A', independently journaled upon separate spindles or axles $a\ a'$.

Mounted upon the axle $a$ and revolving with the driving-wheel A is a sprocket-wheel, G, which imparts motion through the medium of a sprocket-chain, $g'$, to a sprocket-wheel, $g$, mounted upon the outer portion of a secondary shaft, $g^2$, journaled in the main frame B and provided on its inner portions with a gear-wheel, $g^3$, for the purpose hereinafter set forth. A movable frame, F, preferably of the same general form as the main frame B, is mounted upon the upper side of said frame and is hinged to the same at its rear end to allow its forward portion a free limited upward movement. A rock-shaft, E, extends across the forward portion of the main frame B and is journaled in suitable bearings in the side beams of the same.

A projecting tongue or arm, E', is secured to and extends forwardly a suitable distance from the center of the rock-shaft E, and is provided upon its outer free end with a sleeve, E², rigidly secured to the same, which is adapted to loosely embrace the free end of a corresponding tongue or arm, F', rigidly secured to and extending rearwardly from the forward cross-beam of movable frame F. An operating-lever, E³, is secured at one end to said rock-shaft E, and from thence extends rearwardly, and after passing beneath the seed and fertilizer distributing mechanism continues upwardly and rearwardly to one side of the driver's seat C, (secured to the main frame B,) where it is held in the desired adjustment by the upright rack D, provided at its upper part with an upwardly-bent projection or tooth, $D^2$, and at its lower portion with a downwardly-bent projection or tooth, D'. Thus it will be readily seen that when the main operating-lever $E^3$ is pushed downward and engaged and held by the lower tooth or projection, D', the movable frame F is raised from its position on the frame B through the medium of the rock-shaft, tongues, and loose sleeve, and when the lever is raised and held by the upper tooth, $D^2$, the movable frame rests upon the main frame, as shown in Fig. 2, and for the purpose to appear hereinafter.

Upwardly-extending posts $q\ q$ are correspondingly located upon opposite sides of the forward portion of the movable frame F, and are provided in their upper portions with transverse sockets or bearings, in which are loosely mounted short spindles or rollers $q^2\ q^2$, provided upon their inner ends with stops or flanges $q^3\ q^3$. Arms $q^5\ q^5$ are hinged to the outer ends of the rollers $q^2\ q^2$, so as to have a horizontal swing of about ninety degrees, and secured to the outer ends of arms $q^5\ q^5$ and extending downwardly from the same and engaging the ground are the changeable row-markers Q Q, which are intended to make a good visible mark in the ground to serve as a guide for one of the main driving-wheels after each turn when starting upon a new row. Links $q^7$ are pivoted at one end to the hinged ends of the row-marker-carrying arms $q^5$, and at their opposite ends they are pivoted to the forward ends of row-marker-operating levers R R, which extend from the rear end of the machine, within easy reach of the driver's seat, along the opposite sides of the movable frame to the ends of the links, to which they are pivoted. To the rear or handle portions of said marker-operating levers the bent hand-levers $r\ r$ are pivoted and are yieldingly held in their normal position by springs $r'\ r'$, secured to said bent hand-levers and to studs $r^2\ r^2$ upon the levers. Rods $r^3$ connect the elbows of the bent hand-levers with double bent locking-levers $r^4\ r^4$, pivoted to the operating-levers at $r^5$, and the opposite bent ends of said bent levers are adapted to enter openings $s\ s\ s'\ s'$ in upright plates S S, secured to the movable frame opposite each bent lever $r^4\ r^4$. Thus it will be seen that by pulling one of the row-marker-operating levers backward (supposing the row-marker to be in the position shown in Fig. 2) and engaging the bent end of the locking-lever $r^4$ in the upper rear opening, $s$, of the upright holding-plate upon that side the arm $q^5$ will be drawn around to a position at about ninety degrees to its former position, and when the operating-lever is raised, so that the end of the locking-lever $r^4$ can enter the upper opening in the holding-plates S, the spindle or roller $q^2$ will turn a short distance in its socket until the shovel end of the row-marker engages the ground, as shown by the left-hand marker in Fig. 1, and when it is desired to throw the marker out of engagement with the ground the locking-lever is released from engagement with the upper opening of the holding-plate, and the operating-lever is depressed and pushed forward, which operation rotates the roller or spindle in a direction to lift the shovel end of the row-marker from engagement with the ground and throw it forward from its former position, extending laterally from the frame to a position in which the marker-carrying arm is nearly parallel with the side beams of the frame. The row-marker-operating levers are guided in their movement and held against lateral displacement by guide-posts U U, placed upon the outer edges of the side beams of the movable frame between the seed-boxes and the markers.

A shaft-supporting runner, $F^2$, is rigidly secured at its front end to about the center of the forward portion of the movable frame, and its rear end is secured to and supported by a downwardly-bent supporting-brace, $F^3$, secured at its upper end to the movable frame.

The ground-engaging portion of the shaft-supporting runner $F^2$ is provided with a longitudinal slot or opening, $F^4$, and secured to the runner upon opposite sides of said slot are bearing-posts $F^5\ F^5$, in which is journaled a ground-wheel shaft, O', and mounted upon said shaft between the bearing-posts is a ground-measuring wheel, O.

The ground-measuring wheel is composed of radiating spokes provided upon their outer ends with flat shovels adapted to engage with the ground, and thus rotate the wheel and shaft through the longitudinal slot in the ground-wheel-carrying runner. The ground-wheel shaft extends out beyond the sides of the frame, and is provided upon its opposite ends with hill-markers $O^4\ O^4$, secured to said shaft by thumb-screws $O^5\ O^5$, and extending laterally from the same to engage the ground. The ground-wheel shaft O' also carries valve-operating lugs $O^2\ O^2$, secured to the shaft by set-screws $O^3\ O^3$, opposite the edge of each seed and fertilizer dropping valve, hereinafter described, and said lugs should project laterally from the ground-wheel shaft in about the same plane with the hill-markers, as is clearly evident.

A sprocket-wheel, $O^6$, is mounted on the ground-wheel shaft and is connected with a sprocket-wheel, $p^2$, by a sprocket-chain, P. Sprocket-wheel $p^2$ is mounted upon a ground-wheel-regulating shaft, $p'$, which is provided with hand-levers $p^3\ p^3$ within easy reach of the driver's seat, and is journaled in upright posts $p\ p$, secured to the movable frame. By means of the hand-levers, regulating-shaft, and sprocket wheels and chain the driver can rotate the ground-wheel shaft, so that the hills will be dropped and marked at the desired spot.

A stone-removing and ground-leveling scraper, $F^6$, curved in form, is secured in an oblique position to the forward portion of the shaft-supporting runner in front of the ground-wheel, so as to lightly engage the ground when the machine is thrown in gear.

A seed and fertilizer distributing mechanism supporting frame or cross-piece, $l$, is secured to and extends across the movable frame above the ground-wheel. Seed-boxes L L are carried by said cross-piece $l$, which forms a stationary bottom for the same. The lower rear portions of the seed-boxes are cut away, as shown in Fig. 2, the top of said cut-away portions being closed by the horizontal pieces $l^{11} l^{11}$ and the sides of the same by the vertical pieces $l^{10} l^{10}$. The bottoms of the seed-boxes are closed by revolving seed counting and conveying plates $l^5 l^5$, which are provided with any desired number of seed pockets or openings, $l^7 l^7$. Cylinders M M, provided with cone-shaped tops, are rigidly secured to said rotary seed counting and conveying plates $l^5 l^5$ and extend upwardly within the seed-boxes, filling the opening between the pieces $l^{11}$ and $l^{10} l^{10}$, secured to the cut-away portion of the seed-boxes to prevent seed from falling out. As before mentioned, the tops of said revolving cylinders are cone-shaped, as shown, and are provided on their upper extremities with laterally-extending seed stirrers $l^8$, the outer ends of which are bent downwardly, as shown at $l^9$. The diameter of the lower portion of said revolving cylinders should be such that the space between the lower remaining front portion, L', of the seed-boxes and the periphery of said revolving cylinders will be just wide enough to allow the grains of corn to pass through sidewise in an upright position.

The seed pockets or openings $l^7$ are arranged to all be in a semi-circumference of the rotary seed conveyer, and are so placed that they will pass beneath the space between the revolving cylinders in the seed-boxes and the lower front wall, L', of the seed-boxes, and said seed-pockets should be of such a size as to conveniently carry one grain of corn only in an upright position as received from said space between the cylinder and wall of seed-box.

The seed-pockets are adapted to register as they revolve with seed-discharge openings or chambers $l'$ through the stationary bottom $l$ of the seed-boxes. Spring-actuated seed-discharging valves $l^2$ are pivoted to the cross-piece $l$ and retain the seed within the seed-discharge opening $l'$ until the full number of seed to be planted in a hill has been deposited in each of said openings or chambers $l'$.

The seed-discharging valves $l^2$ are composed of vertical portions $l^3$, from the lower end of which valve-arms extend beneath each opening $l'$ in cross-piece $l$, and from the upper portions of said vertical portions $l^3$ the operating-arms $l^9$ extend over the upper face of each rotary seed conveying and counting plate, and the valves are pivoted to the cross-piece $l$, preferably by bolts passing through the laterally-extending arms of the same. Springs $l^4$ are secured to the supporting-frame or cross-piece $l$ and to each vertical portion of the valves to hold the valves normally closing the seed-discharging chamber or opening.

As will be seen by the drawings, the outer peripheries of the rotary seed-conveyers extend beyond the walls of the seed-boxes, and projecting upward from the upper surface of each rotary seed-conveying plate beyond the walls of the seed-boxes are studs $l^6 l^6$, which are adapted to engage with the operating-arms $l^9$ of discharging-valves $l^2$ when a grain of corn has been dropped into each seed-pocket in the seed-conveying plates and each pocket has dropped its grain into the discharge-chambers closed by the valves, and as the studs engage said operating-arms the valves are pushed aside and the corn dropped out of the discharging-chambers, and the valves are immediately forced to their seats, closing the discharge-chambers $l'$, by the before-mentioned springs. The studs $l^6 l^6$ pass through openings $m$ $m$ in the upright pieces $l^{10} l^{10}$ as the rotary seed-conveying plates revolve.

As each seed-pocket is of a size sufficient to hold but a single grain of corn, it is evident that the number of such pockets in each seed-counting plate should correspond to the number of seeds to be planted in each hill; but as it is often desirable to plant a different number of seed in the hills, sometimes in the same field, I provide each seed-pocket with a pivoted cover, 2, so that the number of seed-pockets in use can be readily changed by simply manipulating the pivoted covers 2 2, and to prevent the grains of corn from being broken or cracked I provide the seed-pockets with ascending guide-grooves 3 3, which allow the seed or seeds which may be resting upon the grains in the pockets to slide easily off from the same when the rotary counting-plates revolve, and thus prevent the grains from being cracked or injured.

The cylinders in the seed-boxes and the seed counting and conveying plates are connected and rotated by vertical shafts $m'$, passing through said cylinders and plates and through openings in the supporting-frame $l$, and provided upon their lower ends with bevel-gears $n$ $n$.

Fertilizer and seed dropping and mixing tubes N N are secured to the under side of the supporting-frame beneath each seed-box, the upper portion of the front and rear sides of said boxes being open, as shown in Fig. 5. The open bottoms of said fertilizer and seed mixing and dropping tubes are provided with hinged valves $N^2$, adapted to open downward, and said valves are yieldingly held closed by means of springs $N^3$.

Studs $N^5$ project laterally from the side of each valve, and are adapted to engage with the valve-opening lugs $O^2 O^2$, carried by the ground-wheel shaft, for as the lugs revolve and come in contact with the studs $N^5$ they force open the valves $N^2$ and allow the mingled seed and fertilizer to be dropped, when the valves are closed again by the springs, ready to receive another batch of corn and fertilizer, Movable seed-discharging funnels N' N' are hinged at their rear top edges in the upper portions of said dropping-tubes N N below the seed-discharging chambers, and the front portions of said hinged seed-funnels are connected by means of rods $o'$ $o'$ to catch-levers $o^2$ $o^2$, pivoted at $o^3$ $o^3$ to the front edge of supporting-frame $l$, and to the upper part of said catch-levers are secured springs $o^{10}$ $o^{10}$, whereby the tension of the springs tends to normally hold the discharge-funnels in an upright position, as shown in Fig. 5. Spring-catches $o^5$ $o^5$ are secured at the front edge of the supporting-frame, preferably to lugs $o^{11}$ $o^{11}$, and are provided with hook portions upon their free ends to engage notches in the catch-levers and hold the levers when the same are depressed by studs $o^4$ $o^4$, projecting from the periphery of the seed-conveying plates.

Each rotary seed-conveying plate is provided with a stud, $o^4$, projecting from its periphery, which is adapted to depress the catch-levers, so as to engage and be held by the spring-catches, and thus hold the seed-funnels in an oblique position immediately after seed has been dropped through the same from the seed-discharge chamber, for the purpose hereinafter explained.

Trip-levers $o^6$ $o^6$ are pivoted below the spring-catches, so that a free end of said lever will engage the spring-catches, and the opposite free ends of said levers are connected by means of rods $o^7$ $o^7$ with the inner surface of the hinged seed and fertilizer dropping valves $N^2$. Thus it will be seen that immediately after seed has been dropped from the seed-discharge chambers through the seed-funnels into the mixing and dropping tubes N the catch-levers are depressed by studs $o^4$ $o^4$ and held by the spring-catches, thus forcing the seed-funnels into an oblique position, with their lower openings extending out of the rear top openings in the tubes N. At this point the valve-opening lugs engage the lugs upon the hinged valves and force open said valves and drop the seed and fertilizer into the furrow. When the dropping-valves are forced open, the trip-levers are depressed by the rod-connections, and the ends of said trip-levers, engaging the spring-catches, force said catches out of engagement with the catch-levers, and immediately the springs connected with the same exert their tension and force the seed-funnel to its normal vertical position, with its lower opening in communication with the dropping-tubes. Thus it will be readily seen that seed cannot be discharged into the dropping-tubes before the seed already in the same has been dropped into the furrows prepared for its reception, as the open or discharging end of the seed-funnel is extended through the rear open portion of the dropping-tubes during the time that seed is in the dropping-tubes. Boxes or receptacles 10 are placed below said opening in the rearward portion of the dropping-tubes to catch any seed that might be distributed from the movable funnels N' N' before the seed sufficient for one hill already in the seed-dropping tubes has been dropped by the dropping-valves. This might happen by reason of the fact that the ground-wheel, which operates the dropping-valves, is not much affected by the slight unevenness of the ground, for the shovels of the same pass beneath the surface; but the driving-wheel, which operates the distributing mechanism, must follow up and down all the slight curvatures or undulations of the surface, and hence the driving-wheel sometimes operates with greater rapidity than the ground-wheel, and thus feeds the seed to the dropping apparatus faster than the seed is dropped by the dropping-valves, which would cause seed sufficient for two or more hills to be dropped into one hill if it were not for the hinged funnels and their operating mechanisms. A seed and fertilizer operating-shaft, I, is journaled in the movable frame, and is provided on its outer end with a gear-wheel, $i$, to mesh with gear-wheel $g^3$, operated by the driving-wheel. Bevel gear-wheels $i'$ $i'$ are mounted upon said shaft to engage with bevel-gears $n$ $n$ to drive the seed-counting plates and the revolving cylinders and stirrers.

Fertilizer-boxes H H are mounted upon the supporting-frame $l$ between the seed-boxes, and said fertilizer-boxes are provided with square openings $h$, to register with square pockets $i^3$ $i^3$ in the peripheries of fertilizer-conveying rollers $l^2$ $l^2$, mounted upon shaft I immediately beneath the square openings in the bottom of fertilizer-boxes, and said rollers are surrounded by a sheathing or cover, J, provided with a spout or conduit, K, to carry the fertilizer into the mixing and dropping tubes N through openings $N^4$ in the side walls of the same.

A stirrer-shaft, $h'$, extends through the upper portion of each fertilizer-box and is provided with stirrers $h^4$ $h^4$ (to revolve) in each box. The lower portion of each fertilizer-box is provided with revolving stirrers $h^8 h^8$, mounted upon shafts $h^5$. Said stirrer-shafts are provided upon their ends with sprocket-wheels $h^6$ $h^6$ and $h^2$ $h^2$, connected by sprocket-chains $h^7$, and all of said shafts are driven by means of sprocket-chain $i^5$, connecting a sprocket-wheel, $h^3$, mounted on stirrer-shaft $h'$, with sprocket-wheel $i^4$ upon the main actuating-shaft I. The openings $h$ in the bottoms of the fertilizer-boxes can be closed, when so desired, by means of slides, as when planting a single row.

Opening plow-blades V V are located in front of each dropping-tube and are carried by standards or rods secured by means of bolts to the front portion of each seed and fertilizer tube. The standards or rods V' curve outwardly from the dropping-tubes and thence inwardly and downwardly, where the plow-blades V are secured. Curved scrapers W are carried in an oblique position directly in front of the openers V by means of the standards or rods W', which are secured to the standards or rods at the outward curvature of the same.

The opener and scraper standards are provided at their upper ends with a series of bolt-holes, so that they can be adjusted to dig deeper or shallower, as desired. Rods or standards Y Y are removably secured at their upper ends to the rear sides of the main dropping-tubes, and from thence curve outward and downward, and at their lower portions they are provided with projections Y' Y', extending laterally from each standard Y, and to the ends of said projections Y' are secured the curved furrow-coverers X X. The furrow-coverers are adjustably secured to the projections Y' Y' in an oblique position by means of screws Y² Y², passing through the ends of said projections and the upper rear corners of the covering-blades. Thus the amount of earth thrown over the dropped seed can be regulated by adjusting the rear ends of the coverer-blades closer together or farther apart by means of the screws.

In the extreme lower ends of the standards are journaled rollers Z Z, to engage and roll the covered furrows just in the rear of the coverers, and when it is unnecessary or undesirable to roll the ground they can be readily removed. The upper ends of the standards may be provided with a series of bolt-holes, so that said standards may be raised or lowered and bolted at the desired adjustment to the dropping-tubes.

It will be readily seen that when it is desired to throw the seed distributing and dropping mechanism out of gear with the ground and driving-gear the operator has simply to depress the movable frame-operating lever and engage it with the lower tooth or projection upon the upright rack, which operation will raise the runner and ground-wheel from engagement with the ground and will raise the gear-wheel $i$ from engagement with the gear-wheel $g^3$.

In the present case the hills and rows are planted about four feet apart, and hence the ground-wheel is four feet in circumference, and the dropping-valves are operated and the hills are marked once during every revolution of the ground-wheel; but if it were desired to plant the hills two feet apart it would be necessary that the hill-markers and valve-opening lugs be extended laterally from the ground-wheel shaft in opposite directions, so that the hills would be marked and the valves operated twice during each revolution of the ground-wheel.

It is evident that numerous changes might be made in the construction and arrangement of the various parts herein set forth without departing from the spirit and scope of my invention; hence I do not wish to limit myself strictly to the devices herein shown and described, but consider myself entitled to all such changes and variations.

Having thus fully described my invention, what I claim, and desire to secure by Letters Patent of the United States, is—

1. In a corn-planter, the combination, with a main frame mounted upon supporting-wheels, of a movable frame of such size as to rest and be supported upon the upper side of the main frame, said movable frame being hinged at its rear end to the rear upper side of the main frame to allow its forward end a limited upward movement, a lever connected to the free forward end of the movable frame and extending rearwardly beneath the frames to the rear ends of the same within easy reach of the driver's seat, whereby the movable frame is raised and lowered, and a rack whereby the frame can be held at the desired adjustment, substantially as described.

2. In a corn-planter, the combination, with a main frame mounted upon supporting-wheels, of a movable frame normally resting upon the upper side of the main frame and pivotally secured to the same at its rear portion to allow its forward free end a limited upward movement from said frame, seed distributing and dropping mechanism carried by the movable frame and thrown in and out of gear with the driving-power by the movement of said frame, a rock-shaft transversely journaled in the main frame beneath the free end of the movable frame and connected with the movable frame at its free end, a lever connected with the rock-shaft and extending to the rear of the main frame, whereby the movable frame is operated, and means for holding said lever, and hence the movable frame, in the desired position, substantially as described.

3. The combination, with a main frame mounted upon supporting-wheels, of a movable frame pivoted to and supported upon the upper side of the main frame, seed-distributing mechanism actuated by one of the supporting-wheels, dropping-spouts in communication with the same, fertilizer-distributing mechanism connected with said dropping-spouts, a horizontal shaft, a ground-wheel to actuate the same, and hill-markers mounted upon said shaft, said seed and fertilizer distributing mechanisms and the horizontal shaft being supported and carried by the movable frame, substantially as described.

4. In combination, a main frame, a movable frame hinged at its rear portion upon the same and supporting the seed distributing and dropping mechanism, a rock-shaft journaled in the main frame, tongues secured to the rock-shaft and to the movable frame, a sleeve loosely connecting said tongues, an operating-lever secured to the rock-shaft, and a rack for engaging the operating-lever and holding the movable frame in the desired adjustment, substantially as described.

5. The combination, with a frame and the seed-dropping mechanism of a planter, of a marker pivoted to said frame in vertical and horizontal adjustment and an operating-lever whereby the marker can be thrown upwardly and horizontally out of engagement with the ground, substantially as specified.

6. The combination, with a frame and seed-dropping mechanism of a planter, of changeable row-markers upon opposite sides of said frame, said markers being connected with the frame in vertical and horizontal adjustment, and levers pivoted to said markers, whereby the same can be held in or out of engagement with the ground, substantially as described.

7. The combination, with a frame and the seed-dropping mechanism of a planter, of a horizontal spindle or roller journaled on said frame, a marker hinged to the outer end of said roller, and an operating-lever pivoted to said marker, whereby the same can be held in or out of engagement with the ground, substantially as specified.

8. The combination, with a frame and the seed-dropping mechanism of a planter, of rollers or spindles journaled in horizontal bearings on the frame, outwardly-extending arms hinged to the outer ends of said rollers to have a limited horizontal swing, downwardly-extending arms carrying shovel-blades upon their lower ends, and marker-operating levers pivoted to said outwardly-extending arms, substantially as specified.

9. The combination, with a frame and seed-dropping mechanism, of a marker hinged to a horizontal roller journaled on said frame, an operating-lever pivoted to said row-marker, a hand-lever and locking-lever pivoted to said operating-lever, and a holding-plate secured to the frame and provided with apertures to receive said locking-lever, whereby the marker can be thrown in or out of engagement with the ground and held in the desired adjustment, substantially as specified.

10. The herein-described row-marker, consisting of a roller or spindle journaled in a horizontal bearing or socket in an upright post and provided with a stop upon its inner end, an outwardly-extending arm hinged to the outer end of said arm to swing horizontally, a downwardly-extending arm secured to the free end of said outwardly-extending arm and provided on its lower end with a shovel-blade, an operating-lever, a link pivotally connecting an end of said lever with the inner end of said outwardly-extending arm, a locking-lever and hand-lever pivoted to the handle portion of said operating-lever, and a holding-plate provided with apertures to receive said locking-lever, substantially as set forth.

11. The combination, with a main-frame-supporting wheels and a secondary shaft journaled in said frame and driven by one of the supporting-wheels, the shaft being provided with a gear-wheel, of a movable frame supported upon and pivoted to the main frame, seed and fertilizer distributing mechanisms carried by the movable frame, a shaft journaled in the movable frame and provided with gearing to drive said mechanisms, a gear-wheel upon said shaft to normally mesh with the gear-wheel upon the secondary shaft, and a lever whereby the movable frame can be raised or lowered and the shafts journaled in the frames be thrown in and out of gear with each other, substantially as described.

12. In a corn-planter, the combination, with a main frame, a movable frame supported by the same, and the dropping mechanism, of a runner secured at its upper end to the center forward portion of the movable frame, a brace secured to the movable frame at its ends and bent downward at its center, to which the rear end of the runner is secured, a horizontal shaft journaled in bearings upon the runner, a ground-wheel centrally mounted upon said shaft and adapted to rotate the same, lugs upon said shaft to operate the dropping mechanism, and hill-markers adjustably secured to the outer ends of the shaft, substantially as described.

13. In a corn-planter, the combination, with a main frame and a movable frame supported by the same, of a runner secured at its upper end to the forward central portion of the movable frame and curving downwardly and rearwardly from the same, a downwardly-bent brace secured to the movable frame at its upper end and to the rear end of the runner at its lower central portion, a curved scraper secured across the forward portion of the runner in an oblique position, a horizontal shaft journaled in bearings on the runner, a ground-wheel mounted upon and actuating said shaft, and the seed-dropping valves actuated by said horizontal shaft, substantially as described.

14. In a corn-planter, the combination, with a frame, of the seed-distributing mechanism, the dropping-spouts, spring-actuated dropping-valves provided with laterally-extending lugs and normally closing the lower ends of said spouts, a runner provided with a longitudinal opening, a horizontal shaft carried by the runner, a ground-wheel secured to the horizontal shaft and engaging the ground through the opening in the runner, lugs carried by and revolving with said shaft and adapted to engage the lugs upon the dropping-valves and operate the valves, and hill-markers rotating with said shaft, substantially as described.

15. In a corn-planter, a supporting-frame, a horizontal shaft, a ground-wheel secured to and driving the same, valve-opening lugs, and revolving hill-markers carried by said shaft, in combination with a sprocket-wheel secured to said shaft, an upright frame secured to the supporting-frame near the driver's seat, a horizontal shaft journaled in the upper portion of said upright frame, a sprocket-wheel mounted upon said shaft, a sprocket-chain connecting said two sprocket-wheels, and hand-levers carried by the shaft in the upright frame, substantially as described.

16. The combination, with a seed-dropping spout, of a coverer-standard curving outwardly and downwardly, laterally-extending lugs or arms upon the lower portion of said standard, and curved coverer-blades adjustably secured at their rear portions to said lugs in an oblique position, substantially as described.

17. The combination, with a seed-spout, of a coverer-standard secured to the same and extending rearwardly and downwardly, and provided with a laterally-extending arm upon each side of its lower portion, a pair of curved coverer-blades, each blade being adjustably secured at its rear upper edge to one of said arms in an oblique position, screws to adjustably secure the coverer-blades to said arms, and a roller journaled in the lower end of the standard, substantially as described.

18. In a planter, a seed-dropping tube, in combination with a vertically-adjustable standard secured to and extending forwardly from said tube, an opener-blade, and a curved scraper carried by said standard in front of the seed-tube, a coverer-standard secured to and extending rearwardly from said tube, and coverer-blades carried by said coverer-standard, substantially as described.

19. Furrow-opener standards carrying opener-blades on their lower ends, in combination with scraper-standards secured to said opener-standards and extending forwardly from the same, and curved scrapers secured to the forward ends of said scraper-standards in an oblique position, substantially as specified.

20. In a corn-planter, the combination, with a frame, of a cylindrical seed-distributing box, a horizontally-rotating seed-conveying plate closing the bottom of said seed-box, a cylinder secured to the upper side of said plate and extending upwardly into the interior of the seed-box, said cylinder being adapted to partially close the lower portion of the seed-box and leave a narrow vertical space between its outer periphery and one side of said box for the passage of seed to the seed-plate, whereby the seed is delivered to the pockets of the seed-plate in an upright position, and downwardly-extending stirrers carried by the upper end of said cylinder, substantially as described.

21. In a corn-planter, the combination, with a supporting-frame and a cross-frame carried by the same, of seed-boxes carried upon the upper side of the cross-frame, seed-dropping spouts in communication with the seed-boxes and depending from the cross-frame below the same, spring-actuated dropping doors or valves normally closing the open bottoms of the spouts, means for intermittently opening said valves, fertilizer-boxes carried upon the upper surface of the cross-frame between the seed-boxes, said cross-frame being provided with openings at the bottoms of the fertilizer-boxes, a horizontal shaft journaled beneath the cross-frame, conveying-rollers mounted upon said shaft at the open bottoms of the fertilizer-boxes, a cover or sheath surrounding each roller, and spouts or conduits leading from said covers to the interior of the dropping-spouts above the dropping doors or valves, substantially as described.

22. In a corn-planter, the combination, with a seed-box having a portion of its lower part cut away, of a horizontal plate provided with seed-pockets and revolving in and closing the bottom of said box, a vertical cylinder revolving with said plate and extending upwardly into the box above the cut-away portion, said cylinder being adapted to close the cut-away portion of the box, but leave a vertical space between its periphery and the inner wall of the box opposite the cut-away portion for the passage of seed to the pockets of the rotary plate, whereby the seed is delivered from the seed-box to the seed-pockets of the rotary plate in an upright position, and gearing to drive said plate and cylinder, substantially as described.

23. In a corn-planter, the combination, with a seed-box having a portion of its lower part cut away and horizontal and upright pieces partially closing said cut-away portion, of a horizontal plate provided with seed-pockets and revolving in and closing the bottom of said box, a vertical cylinder provided with a cone-shaped top and revolving with said plate and extending upwardly into the interior of the box, said cylinder being adapted to close the cut-away portion of the box between the horizontal and upright pieces, but leave a space between its periphery and the inner face of the seed-box opposite the cut away portion for the passage of seed to the pockets of the rotary plate, one or more laterally and downwardly extending stirrers within the seed-box upon the cone-shaped top of the cylinder, and gearing to drive said plate and cylinder, substantially as described.

24. In a corn-planter, the combination of a supporting-frame, a cross-frame, a seed-box carried by the cross-frame, a seed-plate provided with seed-pockets and revolving in and closing the bottom of the seed-box, a seed-discharging chamber extending through the cross-frame and with which the seed-pockets register as the seed-plate revolves, a valve pivoted to the cross-frame and normally closing the bottom of said chamber, said valve being operated by the seed-plate to discharge the seed from said chamber when the desired number of seed has been delivered into the same, a dropping-spout into which the seed from said chamber are adapted to fall, and a dropping-valve normally closing the lower end of said spout, substantially as described.

25. In a corn-planter, the combination of a supporting-frame, a cross-frame, a seed-box carried by the cross-frame, a rotary seed-counting plate revolving in and closing the bottom of said box and provided with seed-conveying pockets, a seed-discharging chamber with which said pockets register as the plate revolves, a spring-actuated valve pivoted to the cross-frame and provided with an arm to normally close the bottom of said discharge-chamber and with another arm extending over the face of the rotary plate, one or more lugs extending from the upper face of the plate and adapted to operate said valve to discharge seed from the chamber when the desired number of seed has been received into the same, and a dropping-spout into which the seed from said chamber pass, substantially as described.

26. In a corn-planter, a seed-box, a rotary seed-counting plate provided with seed-conveying pockets, a discharge-chamber provided with a valve, a dropping spout or tube provided with a spring-actuated dropping-valve, and a seed-discharge funnel pivoted within said spout or tube beneath the discharge chamber, substantially as described.

27. In a corn-planter, a seed-box, a rotary seed counting and conveying plate, a dropping tube or spout, a dropping-valve to close the bottom of said tube, and a discharge-funnel pivoted in the upper part of said tube or spout, whereby seed cannot be delivered into the dropping spout or tube until the dropping-valve has been opened and a hill dropped, as described.

28. In a corn-planter, a seed-box, a rotary plate, a dropping spout or tube, a dropping-valve closing the bottom of the same, a discharge-funnel pivoted in said spout or tube, a catch-lever connected with said pivoted funnel and operated by the rotary plate, a trip-lever connected with said dropping-valve, and a spring-catch, for the purpose set forth.

In testimony of said invention I have hereunto set my hand.

JOSEPH FEHRER.

Witnesses:
D. C. WINEBRENER,
ABRAM. S. BOHN.